United States Patent [19]

Suggitt et al.

[11] 3,920,744

[45] Nov. 18, 1975

[54] PRODUCTION OF AMINES FROM SULFUR BEARING PARAFFINS

[75] Inventors: Robert M. Suggitt, Wappingers Falls; Walter C. Gates, Jr., Newburgh, both of N.Y.

[73] Assignee: Texaco Inc., New York, N.Y.

[22] Filed: Dec. 26, 1973

[21] Appl. No.: 428,507

[52] U.S. Cl. .................... 260/583 M; 260/583 R
[51] Int. Cl.$^2$.................. C07C 87/04; C07C 87/14; C07C 87/127
[58] Field of Search ................... 260/583 R, 583 M

[56] References Cited
UNITED STATES PATENTS

| | | | |
|---|---|---|---|
| 2,331,968 | 10/1943 | Forney .................... | 260/583 R X |
| 3,657,347 | 4/1972 | Muller et al. ............ | 260/583 R X |
| 3,780,107 | 12/1973 | Polansky et al. .......... | 260/583 R X |

*Primary Examiner*—Paul F. Shaver
*Attorney, Agent, or Firm*—Thomas H. Whaley; Carl G. Ries; George J. Darsa

[57] ABSTRACT

A process is provided for producing amines from paraffin feedstocks containing sulfur impurities deleterious to nitration and hydrogenation of the paraffin to amines by nitrating a paraffin charge substantially free of sulfur compounds to produce a mixture containing paraffin, nitroparaffin and by-products, hydrogenating the nitroparaffin in the mixture to an amine, recovering the amine from the paraffin and by-products, introducing and hydrogenating a paraffin feedstock containing substantial amounts of sulfur compounds, hydrogenating the mixture of paraffin and by-products, and recycling the hydrogenated feedstock and hydrogenated mixture as paraffin charge to the nitration step.

14 Claims, No Drawings

PRODUCTION OF AMINES FROM SULFUR BEARING PARAFFINS

This invention relates to the production of amines from paraffins. More specifically, this invention relates to the production of secondary alkyl primary amines having from 12 to 30 carbon atoms from paraffin hydrocarbon feedstocks containing sulfur compounds deleterious to nitration and hydrogenation. In particular, this invention relates to a continuous process for the production of primary amines from impure paraffin hydrocarbon feedstocks.

Heretofore, primary amines have been prepared by initially nitrating paraffins with nitric acid, nitrogen dioxide or dinitrogen tetroxide and subsequently reducing the nitroparaffin in the presence of a hydrogenation catalyst to the amine. The feedstocks employed consisted of paraffins having from 12 to 30 carbon atoms and were provided essentially free of sulfur compounds. However, many commercially available $C_{12}$ to $C_{30}$ paraffin feedstocks contain significant amounts of sulfur, that is, amounts of 20 parts per million and higher, as for example, feedstocks derived by urea dewaxing mixtures of isoparaffins, naphthenes, aromatics, sulfur compounds and n-paraffins. The nitration of such impure paraffin feedstocks in the course of preparing amines results in the formation of sludge-like materials during nitration. Where continuous operations over extended periods of time are contemplated, substantial quantities of the sludge will be formed in the course of nitration. Subsequent hydrogenation of the nitrated product where the nitroparaffin is converted to the amine is adversely affected in that the hydrogenation catalyst is depressed in activity. Consequently, to maintain the same level of conversion of nitroparaffins to amines, more severe hydrogenation temperature conditions are required. However, higher temperatures adversely affect the selectively and yield to the desired primary amine product. Moreover, amines derived from such sulfur containing paraffin feedstocks will contain similar levels of sulfur impurities present in the feed. As can be seen, the impurities ultimately lead to a highly unsatisfactory process for converting paraffins to amines.

It is therefore an object of this invention to provide a process for converting paraffin hydrocarbon feedstocks containing sulfur compounds to amines.

Another object of this invention is to provide a process for the production of primary amines from n-paraffins containing sulfur compounds which overcomes sludge formation during nitration and does not adversely affect the hydrogenation catalyst activity or selectivity during hydrogenation of the nitroparaffin to secondary alkyl primary amines.

Yet another object of this invention is to provide a process for the production of substantially pure primary amines from paraffin feedstocks containing sulfur compounds.

Other objects and advantages will become apparent from a reading of the following detailed description and examples.

SUMMARY OF THE INVENTION

Broadly, this invention contemplates a process for producing primary amines from paraffins which comprises:

a. nitrating a paraffin charge substantially free of sulfur compounds and converting from about 5 to 50 weight percent of the paraffin to produce a liquid mixture containing paraffin, nitroparaffin and byproducts;

b. hydrogenating the liquid mixture of (a) and converting the nitroparaffin to primary amine;

c. recovering the primary amine formed in (b) from a mixture of paraffin and byproducts;

d. introducing an impure paraffin feedstock containing at least 20 parts per million of sulfur as sulfur compounds and hydrogenating the feedstock in the presence of a hydrogenation catalyst at a temperature of from about 500° to 780°F., preferably 600° to 750°F.;

e. hydrogenating the mixture of paraffin and by-products of (c); and f. introducing the hydrogenated feedstock of (d) and the hydrogenated mixture of (e) as the paraffin charge to (a).

In another embodiment the impure feedstock and mixture of paraffin and by-products from step (c) are together hydrogenated initially at a temperature of from about 250° to 500°F. and subsequently at 600° to 750°F. In a particularly desirable embodiment, the paraffin and by-product mixture from step (c) is hydrogenated in step (e) initially at a temperature of from about 250° to 500°F. and subsequently hydrogenated at a temperature of from about 600° to 750°F.

In a highly preferred embodiment, the paraffin and by-product mixture from step (c) is initially hydrogenated at from about 250° to 500°F., and the initially hydrogenated mixture along with the impure feedstock are subsequently together hydrogenated at a temperature of from about 600° to 750°F.

PARAFFIN FEEDSTOCK DESCRIPTION

The impure paraffin feedstock containing substantial amounts of sulfur compounds, that is, at least from 20 parts per million of sulfur as sulfur compounds and up to 2000 parts per million, comprise straight chain aliphatic hydrocarbons containing from 12 to 30 carbon atoms. Such hydrocarbons include n-dodecane, n-tetradecane, n-pentadecane, n-octadecane, n-eicosane, n-docosane, n-pentacosane, n-octacosane, and n-triacontane.

Typical paraffin hydrocarbons and mixtures thereof applicable to this invention include hydrocarbons containing from 12 to 30 carbon atoms which may be obtained, for example, from such processes as urea or solvent dewaxing which are capable of recovering n-paraffins from mixtures of isoparaffins, naphthenes, aromatics and n-paraffins. Mixtures of n-paraffins containing from 12 to 25 carbon atoms, or 15 to 21 carbon atoms, or 20 to 30 carbon atoms can be obtained.

Normal paraffins are generally obtained from selected petroleum fractions. Ordinarily, paraffinic crudes are chosen as the source or base stock for the n-paraffin. All crudes, however, including those regarded as sweet contain some sulfur compounds and the sulfur content of the crude can vary from a few tenths percent up to over five percent. The sulfur compounds are distributed throughout all fractions which may be distilled from the crude. Generally, however, the amount of sulfur increases as the boiling range of the fraction increases. Consequently, a petroleum distillate obtained from the crude and comprising normal paraffins having from 12 to 30 carbon atoms will contain sulfur compounds. Among the sulfur compounds typically found in the $C_{12}$ to $C_{30}$ petroleum fraction are mercaptans, thiophenes, arylsulfides, alkylsulfides and cycloalkylsulfides having boiling points ranging within the boiling points of the $C_{12}$ to $C_{30}$ n-paraffins. Separation of the normal paraffins by, for example, solvent dewaxing or urea dewaxing does not separate all of the sulfur compounds from the n-paraffin, and sulfur compounds such as n-alkylmercaptans and n-alkylsulfides remain in the n-paraffin feedstock together with a portion of the thiophenes, arylsulfides, cycloalkylsulfides, isoalkylmercaptans and isoalkylsulfides. Generally, the n-paraffin feedstock will contain from about 20 to 2000 parts per million by weight of sulfur present in the form of organosulfur compounds, the amount depending upon the boiling range of the fraction and the technique used to separate the n-paraffin from the fraction. In addition to the sulfur compounds, the n-paraffin feedstock may also contain from 0 to 10,000 parts per million of other materials having from 12 to 30 carbons such as linear olefins, non-linear olefins, nitrogen compounds including n-alkylamines and n-alkylnitriles and n-alkyloxygenates including peroxides, alcohols, and ketones. In addition, the n-paraffin feedstock may contain $C_{12}$ to $C_{30}$ hydrocarbons such as isoparaffins, naphthenes and aromatics boiling in the feedstock range in amounts from 0 to 20 weight percent. Preferably, the feedstock is substantially free of these non-n-paraffin hydrocarbons, that is amounts less than 5 weight percent.

NITRATION

The nitration of $C_{12}$ to $C_{30}$ paraffin hydrocarbon charge to secondary mono-nitroparaffins is conducted in a liquid-vapor process. The hydrogenated paraffin hydrocarbon feedstock provided herein and more fully discussed below and hydrogenated recycle materials together forming the charge are contacted with a nitrating agent, such as nitrogen dioxide, dinitrogen tetroxide or nitric acid, at a temperature of from about 250° to 500°F. at pressures ranging from atmospheric to 20 atmospheres thereby converting from about 5 to about 50 per cent of the paraffin hydrocarbon principally to the corresponding secondary mono-nitroparaffin. By secondary mono-nitroparaffin we mean that the nitro group is predominantly located on other than the paraffin's terminal carbon atom.

The amount of nitrating agent employed can vary within wide limits, as for example, from about 0.05 to 0.55, preferably 0.1 to 0.3, moles of nitrating agent per mole of paraffin. Any excess nitrating agent can be recovered along with, for example, nitric oxide, a gaseous reaction by-product, the latter in continuous operations subsequently oxidized to nitrogen dioxide and the nitrating agent stream recycled for reintroduction into the nitration reaction zone.

In the course of nitration, reaction by-products are formed including $C_{12}$ to $C_{30}$ ketones, alcohols, carboxylic acids, nitrites, nitrates and multifunctional by-products, such as dinitroparaffins, nitroalcohols, nitroketones, nitroolefins, nitroacids and trinitroparaffins. These by-products are carried along in the liquid crude nitration product after separation of such offgases as nitrogen, nitrous oxide, carbon dioxide, carbon monoxide, nitric oxide, water and unreacted nitrating agent. The crude nitrated liquid product typically comprises from 5 to 35 weight percent nitroparaffin and from 0.5 to 15 weight percent by-products.

HYDROGENATION TO AMINE

The secondary mono-nitroparaffins described above contained in the crude liquid nitrated product are substantially hydrogenated to secondary alkyl primary amines at average conversion temperatures ranging from about 100° to 450°F. in the presence of conventional and well-known hydrogenation catalyst. Preferably the crude liquid product is caustic washed in an aqueous medium prior to the hydrogenation where some of the by-products deleterious to hydrogenation catalyst life are removed.

The crude liquid hydrogenated product comprises a $C_{12}$ to $C_{30}$ n-paraffin, secondary alkyl primary amine and lesser amounts of secondary alkyl secondary amine, alcohols, ketones, unconverted nitroparaffin, water and polyfunctionals such as nitroamines, aminoketones and aminoalcohols. Conventional recovery procedures may be employed for recovering the desired primary amine as by distilling the hydrogenated product by stepwise fractionation. Alternatively, the amine may be converted and recovered as an amine salt by reaction of the crude liquid product with an inorganic acid followed by further treatment of the amine salt with alkali and thereafter recovering the primary amine by distillation. In another procedure the amine containing liquid hydrogenation product is treated with carbon dioxide at about 15° to 100°C. under pressures ranging from 100 to 500 p.s.i.g. where the hydrogenated product is admixed with from about 1 to 10 moles of carbon dioxide per mole of amine present in the hydrogenation product until substantial quantities of an amine-carbon dioxide complex are formed in mixture with paraffins and by-products. This mixture is thereafter contacted with from about 1 to 5 parts by weight of alkanol-water solvent mixture substantially saturated with carbon dioxide. Contacting the paraffin and the complex with the solvent mixture, for example, methanol-water, causes a solvent phase to form containing substantially all of the nitroparaffin by-products and secondary amine. It will be appreciated that the separation technique employing carbon dioxide is selective in removing primary amine and rejecting secondary amine. Separation employing a strong inorganic acid extracts both primary and secondary amines which can be subsequently separated by distillation after neutralization. The solvent phase is thereafter heated to about 60° to 150°C., or alternatively the pressure of the solvent phase is reduced, thereby springing the amine and flashing off carbon dioxide and a portion of the solvent. The amine is recovered from residual solvent by distillation or a combination of distillation and decantation and the purity of the amine recovered is in excess of 95 weight per cent.

The mixture of unreacted nitroparaffin and by-products of the nitration and hydrogenation reactions and unconverted n-paraffin separated from the primary amines form a raffinate that is upgraded by the recycle hydrogenation described in detail below.

HYDROGENATION OF FEEDSTOCK

The impure n-paraffin feedstock described above containing at least 20 and up to 2000 parts per million of sulfur as sulfur compounds is hydrogenated over a conventional sulfur resistant hydrogenation catalyst at a temperature of from about 500° to 780°F., preferably 600° to 750°F., whereby the sulfur compounds are converted to hydrogen sulfide and hydrocarbons to provide a hydrogenated feedstock comprising less than 10 parts per million of sulfur as sulfur compounds. Hydrogen sulfide and hydrocarbons lighter than $C_{12}$ are separated from the hydrogenated feedstock by, for example, fractionation or flashing. In addition any impurities present in the feedstock such as n-alkylmercaptans, n-alkylsulfides, linear olefins, n-alkylamines, n-alkylnitrites and n-alkyloxygenates are hydrogenated to n-paraffins, and by-product hydrogen sulfide, ammonia or water. An advantage of the instant process is that it provides for the conversion of these additional impurities by hydrogenation into n-paraffin feedstock material.

Conventional hydrogenation catalysts resistant to deactivation by sulfur compounds are employed including, for example, Group VIII metal catalysts such as nickel, cobalt, platinum, palladium, rhodium and ruthenium. The catalysts can be supported on kieselguhr, silica or alumina. Preferably, we employ an alumina supported Group VIII metal or a mixture of an alumina supported Group VIII metal and Group VIB metal such as molybdenum or tungsten. Highly preferred catalysts are platinum on alumina, cobalt-molybdenum on alumina or nickel-molybdenum on alumina. Hydrogenation of the impure feedstock is undertaken in the presence of hydrogen pressures ranging from about 100 to 1500 p.s.i.g. for periods of 0.1 to 5 hours. In continuous processing, the impure feedstock is introduced to a hydrogenation reactor at space velocities from 0.2 to 10 v./v./hr.

RECYCLE HYDROGENATION

The unreacted nitroparaffin and byproducts of the nitration and hydrogenaton reactions in admixture with the paraffin separated and described above are upgraded and made suitable for recycle and introduction to the initial nitration reaction by means of a hydrogenation treatment. Typically the recycle mixture contemplated for hydrogenation in accordance with the instant invention is predominantly $C_{12}$ to $C_{30}$ n-paraffin containing from 0 to 5 weight per cent unconverted nitroparaffin and from 0.5 to 15 weight per cent of all by-products. Representative of the by-products are $C_{12}$ to $C_{30}$ oxygenated, nitrated or nitrooxidized materials illustrated by alcohols, ketones and polyfunctionals including nitroketones, nitroalcohols, nitrates, nitrites, and dinitroparaffins. The mixture may also contain aminated by-products such as secondary amines, aminoketones, aminoalcohols and unextracted amine product. The feed for the hydrogenation treatment can also include such byproduct streams from the process as, for example, the bottoms from the amine distillation which consist of primarily secondary amines and polyfunctional products as aminoalcohols or aminoketones. Also, the organic material sprung with acid from the caustic extract generated in contacting the crude nitration product contains organics which can be converted to paraffins for recycle and the paraffin stream derived from the initial vacuum distillation of the crude amines can be added to the recycle mixture intended for hydrogenolysis. These waste streams, when upgraded in accordance with the instant invention, eliminate the need for special handling and disposal and at the same time provide for the recovery of valuable feedstock. The mixture can contain some or all of the aforementioned byproducts in varying amounts depending upon the conditions and reaction employed for the initial nitration of the paraffin, the subsequent hydrogenation of the nitroparaffin to primary amine and the procedure employed for separating and recovering the secondary alkyl primary amine.

The above mixture of n-paraffin, nitroparaffin and by-products can be essentially converted to a recycle stream composed of at least 98 and preferably 99 weight per cent or higher of the original $C_{12}$ to $C_{30}$ n-paraffin purity while deterring cracking or isomerization of the paraffin and where the material suitable for recycle to the initial nitration reaction is substantially free of olefins, isomerized n-paraffins, oxygenates and cracked light hydrocarbons by catalytically hydrogenating the mixture at a temperature of from about 600° to 750°F., preferably between about 650° and 710°F., for a time of sufficient duration whereby the $C_{12}$ to $C_{30}$ linear nitrogenated and oxygenated compounds contained in the mixture are substantially converted to n-paraffins. Where the mixture contains unconverted nitroparaffins, nitrates and nitrites, the mixture is initially hydrogenated at 250° to 500°F. and thereafter hydrogenated at 600° to 750°F.

An additional hydrogenation treatment may in some instances be desirable as, for example, where the liquid product hydrogenated at about 600° to 750°F. is found to contain small amounts of olefins. Such an additional hydrogenation treatment can be conducted at from about 450° to 650°F. whereby the olefins are converted to n-paraffin.

In general, hydrogenation of the mixture is undertaken in the presence of hydrogen pressures ranging from about 100 to 1,500 p.s.i.g. for periods of from 0.1 to 5 hours. In continuous processing, the mixture can be introduced at space velocities of from 0.2 to 10 v./v./hr. Conventional hydrogenation catalysts can be employed as, for example, nickel, cobalt, molybdenum, platinum, palladium and rhodium. The catalysts may be supported on kieselguhr, silica or alumina as is known in the art. Preferably, we employ an alumina supported Group VIII metal or a mixture of Group VIB and VIII metal. A highly preferred catalyst is composed of platinum or nickel-molybdenum or cobalt-molybdenum on an alumina support.

COMBINED HYDROGENATION OF FEEDSTOCK AND RECYCLE

In preferred embodiments of this invention, the impure feedstock and recycle mixture are together hydrogenated over the conventional catalysts described above at temperatures of from about 600° to 750°F. The feedstock and mixture can be combined prior to introduction to the hydrogenation reactor or the individual streams can be simultaneously introduced to the reactor and contacted with the catalyst at hydrogenation conditions of 600° to 750°F., hydrogen pressures of 100 to 1500 p.s.i.g. for periods of 0.1 to 5 hours or at space velocities of 0.2 to 10 v./v./hr. In a highly preferred embodiment, the recycle mixture is initially hydrogenated at 250° to 500°F. and the initially hydrogenated mixture along with the impure feedstock are subsequently together hydrogenated at from 600° to 750°F. In another embodiment, the impure feedstock and mixture are together hydrogenated at 250° to 500°F. and subsequently hydrogenated at 600° to 750°F. The combined hydrogenation of feedstock and mixture together is particularly advantageous in that economies in construction and operating costs are provided whereby the number of hydrogenation reactors needed are reduced and hydrogen handling systems are simplified.

The instant process embodying the improvements related to upgrading the impure feedstock and recycle stream provides a highly selective process for the production of secondary alkyl primary amines essentially free of sulfur compounds. These amines can be employed as mold-release agents, emulsion freeze-thaw stabilizers, pigment dispersing agents, polyurethane catalysts and anti-caking anti-dusting agents. The amines can also be used as corrosion inhibitors, deleterious bacterial control agents, sludge dispersants and as detergents and de-icers in gasolines.

In order to more fully illustrate the nature of this invention and the manner of practicing the same, the following examples are presented. In these examples the best mode contemplated for carrying out the invention is set forth.

EXAMPLE I

A continuous process for converting n-paraffins to secondary alkyl primary amines is undertaken by providing a $C_{12}$ to $C_{26}$ n-paraffin charge having an average molecular weight of 271 with the major amounts of paraffins on a weight percent basis being: $C_{16}$ 4.8%, $C_{17}$ 9.6%, $C_{18}$ 15.8%, $C_{19}$ 17.4%, $C_{20}$ 16.6%, $C_{21}$ 13.5%, $C_{22}$ 9.2% and $C_{23}$ 5.7%.

100 pounds per hour of the charge are nitrated with 4.8 pounds per hour of nitrogen dioxide wherein nitration proceeds at 335° to 345°F. at atmospheric pressure for two hours.

104 pounds of the crude nitrated paraffin product comprising about 74 pounds of paraffin, 24 pounds of nitroparaffins and 6 pounds of oxidized paraffins and polyfunctionals are continuously caustic washed with about 30 pounds per hour of 5 percent aqueous sodium hydroxide in a line mixer at 180°F. The resulting aqueous layer is separated in a settler and removed. The organic layer is washed at 180°F. with 5 pounds per hour of water in a conventional countercurrent extraction tower. The washed nitrated product contains 22 pounds of nitrated paraffin and 78 pounds of n-paraffin and other materials that include ketones, nitrites and nitrates. Fifty pounds of heptane is added to the crude product to facilitate handlings in the subsequent processing steps.

The crude nitrated paraffin composition is introduced at an inlet temperature of 230°F. to a hydrogenation reactor containing a hydrogenation catalyst composed of one weight percent palladium on carbon at a liquid hourly space velocity of 1.8 volumes of liquid per volume of catalyst per hour. Hydrogenation is conducted under a hydrogen pressure of 550 p.s.i.g. and up to a maximum conversion temperature of 380°F. Following hydrogenation, substantially all of the nitroparaffin is reduced to amine. Hydrogen, ammonia and some water are removed as gases and remaining water and ammonia are decanted from the recovered crude hydrogenation product at 110°F.

147 pounds per hour of the crude hydrogenation product including the heptane added above are contacted and saturated with 9 pounds per hour of carbon dioxide at 300 p.s.i.g. and 110°F. thereby forming an amine carbon dioxide complex. The carbon dioxide saturated crude hydrogenation product is counter-currently contacted in a tower with 490 pounds per hour of a solvent mixture comprising 70 weight percent methanol and 30 weight percent water, the solvent mixture having been previously saturated with 10 pounds per hour of carbon dioxide at 300 p.s.i.g. and 110°F. Upon contacting the carbon dioxide saturated crude hydrogenation product with the solvent mixture, the primary amine complex transfers from the predominantly paraffin stream to the solvent stream.

The amine depleted paraffin stream is subsequently reduced to atmospheric pressure in a flash drum whereupon carbon dioxide and heptane therein are removed overhead. The amine-enriched solvent stream is heated to 150°F. and introduced to a flash tower maintained at atmospheric pressure where carbon dioxide, along with some methanol and water, is removed overhead. The amine-rich liquid from the flash tower is passed through a fractionator where methanol, residual carbon dioxide and some water are removed overhead. The bottom stream containing water, heptane and crude amines separates as two phases, namely a water phase containing some methanol and amines, and a crude amine phase containing heptane and some water.

21 pounds per hour of the crude amine phase are heated to 248°F. and flashed at 100 mm. Hg thereby removing as overhead substantially all of the residual methanol, water and heptane. The flashed crude amine phase is thereafter vacuum-distilled to remove residual methanol, water, paraffinic hydrocarbons and lighter than $C_{12}$ amines. Finally, the amine phase is vacuum distilled to produce 17 pounds per hour of finished amine containing 97 weight percent primary amines and less than 5 parts per million of sulfur as organosulfur compounds. About 2 pounds of bottoms are also recovered.

The amine-depleted paraffin stream from the raffinate flash drum after flashing off the heptane is combined with the predominantly paraffinic waste stream derived from vacuum distilling the crude amines to form a recycle stream comprising about 94.9 percent hydrocarbons, 0.6 percent nitrated hydrocarbons and about 4.5 percent oxygenated and other by-products. The mixed recycle stream is introduced into an initial hydrogenation reactor at the rate of 77 pounds per hour and hydrogenated at 400°F. with 2 pounds per hour of hydrogen at a liquid hourly space velocity of 2.0 in the presence of a nickel-molybdenum on alumina catalyst.

24 pounds of an impure paraffin feedstock having an average molecular weight of 271 with the major components corresponding to that described as the charge above and containing 715 parts per million of sulfur present as organosulfur compounds is together hydrogenated with the product of the initial hydrogenation described above at the rate of 101 pounds per hour at 670°F. with 3 pounds per hour of hydrogen at a liquid hourly space velocity of 0.9 in the presence of a nickel sulfide molybdenum sulfide on alumina catalyst. After separating hydrogen, ammonia, hydrogen sulfide, ammonium sulfide and water, the hydrogenated product contains about 5 parts per million of sulfur present as sulfur compounds and 100 pounds are recycled for introduction to the nitration reactor as the $C_{12}$ to $C_{26}$ n-paraffin charge.

EXAMPLE II

An impure paraffin feedstock containing 715 parts per million of sulfur as in Example I is introduced as the charge to a nitration reactor under the conditions described in the preceding example. Substantial formation of sludge is observed in the nitration reactor and crude nitration product. Hydrogenation of the crude containing sludge, after filtration and caustic washing, requires a higher inlet temperature of 276°F. and a lower space velocity of 1.0 than Example I to obtain the same degree of nitroparaffin hydrogenation. However, these conditions reduce the selectivity to primary amine and increase the amount of secondary amine formation. The primary amine product separated as in Example I contains 520 parts per million of sulfur present as organosulfur compounds.

We claim:

1. A process for producing primary amines from paraffins which comprises:
   a. nitrating a paraffin charge substantially free of sulfur compounds, wherein said paraffin is a straight chain aliphatic hydrocarbon of from 12 to 30 carbon atoms, and converting from about 5 to 50 weight percent of said paraffin to produce a mixture containing paraffin, nitroparaffin and by-products;
   b. hydrogenating said mixture of (a) and converting said nitroparaffin to primary amine;
   c. recovering said primary amine formed in (b) from a mixture of paraffin and byproducts;
   d. introducing an impure paraffin feedstock containing from 20 parts and up to 2000 parts per million of sulfur as sulfur compounds, wherein said paraffin comprises straight chain aliphatic hydrocarbons of from 12 to 30 carbon atoms, and hydrogenating said feedstock in the presence of a hydrogenation catalyst at a temperature of from about 500° to 780°F.;
   e. hydrogenating said mixture of paraffin and by-products of (c); and
   f. introducing said hydrogenated feedstock of (d) and said hyrogenated mixture of (e) as said paraffin charge to (a).

2. A process according to claim 1 wherein said temperature in (d) is from 600° to 750°F.

3. A process according to claim 1 wherein said hydrogenation in (e) is conducted at from about 250° to 750°F.

4. A process according to claim 1 wherein said hydrogenation in (e) is conducted at from about 600° to 750°F.

5. A process according to claim 1 wherein said hydrogenation in (e) is conducted at from about 650° to 710°F.

6. A process according to claim 1 wherein said impure feedstock of (d) and said mixture of paraffin and by-products of (c) are together hydrogenated at from about 600° to 750°F.

7. A process according to claim 1 wherein said impure feedstock of (d) and said mixture of paraffin and by-products of (c) are together hydrogenated initially at from about 250° to 500°F. and subsequently at from about 600° to 750°F.

8. A process according to claim 1 wherein said mixture of paraffin and byproducts in (e) is initially hydrogenated at from about 250° to 500°F. and subsequently hydrogenated at from about 600° to 750°F.

9. A process according to claim 1 wherein said mixture of paraffin and byproducts of (c) is initially hydrogenated at from about 250° to 500°F. and subsequently hydrogenated together with said impure feedstock of (d) at from about 600° to 750°F.

10. A process according to claim 1 wherein said hydrogenating in (d) and (e) is conducted in the presence of a Group VIII metal on alumina catalyst.

11. A process according to claim 10 wherein said catalyst is platinum on alumina.

12. A process according to claim 10 wherein said catalyst additionally contains a Group VIB metal.

13. A process according to claim 12 wherein said catalyst is cobalt-molybdenum on alumina.

14. A process according to claim 12 wherein said catalyst is nickel-molybdenum on alumina.

* * * * *